No. 766,114. PATENTED JULY 26, 1904.
A. R. OTTERMAN.
WHIFFLETREE HOOK.
APPLICATION FILED MAY 6, 1903.
NO MODEL.

Witnesses:

Inventor
Arthur R. Otterman
By
Attorneys

No. 766,114.

Patented July 26, 1904.

UNITED STATES PATENT OFFICE.

ARTHUR R. OTTERMAN, OF BRIDGEVILLE, PENNSYLVANIA, ASSIGNOR OF ONE-HALF TO THE OTTERMAN MANUFACTURING COMPANY, A CORPORATION OF PENNSYLVANIA.

WHIFFLETREE-HOOK.

SPECIFICATION forming part of Letters Patent No. 766,114, dated July 26, 1904.

Application filed May 6, 1903. Serial No. 155,840. (No model.)

*To all whom it may concern:*

Be it known that I, ARTHUR R. OTTERMAN, a citizen of the United States of America, residing at Bridgeville, in the county of Allegheny and State of Pennsylvania, have invented certain new and useful Improvements in Hooks for Whiffletrees, &c., of which the following is a specification, reference being had therein to the accompanying drawings.

This invention relates to certain new and useful improvements in hooks for whiffletrees, neck-yokes, and other analogous purposes; and the object of the invention is to construct a simple, cheap, and effective hook in which the ring or link of the attaching connection when placed in engagement with the hook may be effectually prevented from accidental disengagement therefrom.

Briefly described, the invention comprises an encircling member adapted to be secured to the neck-yoke, whiffletree, or like device, and which member carries a pair of parallel cheek-pieces provided at their outer edge with notches or recesses into which the ring or link is adapted to be inserted in order to permit a swinging movement of the hook in order to engage the latter in said ring or link. The hook member is pivotally secured between the two parallel cheek-pieces, and when the hook is in its extended position the pivoted arm or leg of the hook is in alinement with the notches made in the cheek-pieces.

In describing the invention in detail reference is had to the accompanying drawings, forming a part of this specification, and wherein like characters of reference indicate like parts throughout the several views, in which—

Figure 1:
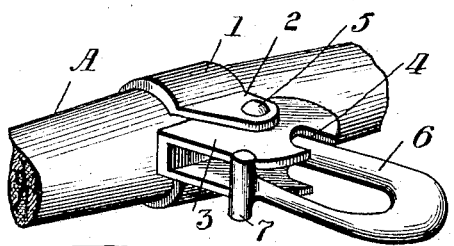
Figure 2:
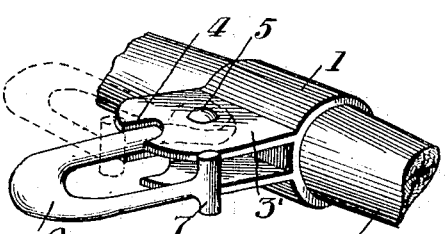
Figure 3:
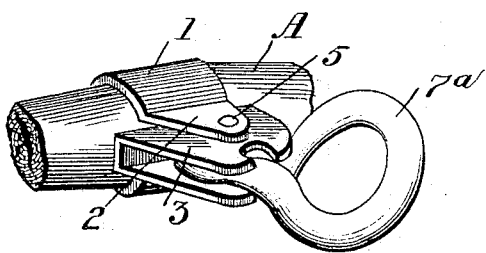

Figure 1 is a detail perspective view of a part of the neck-yoke with my improved hook secured thereto. Fig. 2 is a like view of a modified form of construction. Fig. 3 is a similar view of another form of construction as employed on the center of a neck-yoke.

My invention embodies in its construction an encircling band for embracing the neck-yoke, whiffletree, or the like at the center thereof and at the ends, and in the construction shown in Fig. 1 of the drawings the band 1 has extended lugs 2 at its ends which embrace the substantially U-shaped piece embodying two cheek-pieces 3, each of which is provided with notches or recesses 4. The pivot pin or bolt 5, which fastens the lugs 2 to the U-shaped piece, also secures the hook 6, which may, if desired, be made with a T-shaped end 7, as shown in this view.

In Fig. 2 I show the band 1 having the cheek-pieces 3' formed integral therewith, these cheek-pieces being provided with notches 4 and having the same form of hook 6 as shown in Fig. 1.

In Fig. 3 substantially the same form of device attached to the neck-yoke A is shown as that employed in device shown in Fig. 1, a different form of hook, however, being employed in lieu of the hook 6, as seen in Figs. 1 and 2. It is understood that wherein I use the term "cheek-pieces" I include the construction which shows these cheek-pieces formed integral with the band or separate pieces secured thereto, as shown in Figs. 1 and 3. The hook 7ª (shown in Fig. 3) is given a partial coil in order to bring its free end over to one side of the shank of the hook.

By the construction herein shown it will be observed that the long arm of the hook is pivoted directly in the rear of the recesses 4 of the forwardly-projecting cheek-pieces 3, and therefore when the hook is in its operative position the said long arm will lie directly between and in vertical alinement with said recesses, so as to practically close the same, or, in other words, this arrangement will prevent the link or the like engaged by the hook from gaining access thereto. As the long arm projects forwardly of and in alinement with the recesses of the cheek-plates, the curved portion of the hook and the other arm thereof is necessarily normally arranged to one side of said recesses.

It will be noted that various changes may be made in the details of construction without departing from the general spirit of my invention.

Having fully described my invention, what I claim as new, and desire to secure by Letters Patent, is—

1. In combination with a band having parallel cheek-pieces formed with alining recesses, a hook having an arm pivoted between said cheek-pieces in the rear of the recesses thereof, said arm normally extending between said recesses and being in alinement therewith.

2. In combination with a band having parallel cheek-pieces formed in their forward edges with alining recesses, a hook member comprising an arm bent at its outer end and terminating in a rearwardly-extending arm, said first-named arm being pivoted between the cheek-pieces at a point in the rear of the recesses thereof and extending forwardly between said recesses and in alinement therewith whereby the bent portion and the last-named arm of said hook will normally lie to one side of said recesses.

In testimony whereof I affix my signature in the presence of two witnesses.

ARTHUR R. OTTERMAN.

Witnesses:
A. M. WILSON,
E. E. POTTER.